United States Patent [19]

Bergen et al.

[11] Patent Number: 5,067,014
[45] Date of Patent: Nov. 19, 1991

[54] THREE-FRAME TECHNIQUE FOR ANALYZING TWO MOTIONS IN SUCCESSIVE IMAGE FRAMES DYNAMICALLY

[75] Inventors: James R. Bergen, Hopewell Township, Mercer County; Peter J. Burt, Princeton Township, Mercer County; Rajesh Hingorani, Plainsboro Township, Middlesex County, all of N.J.; Shmuel Peleg, Jerusalem, Israel

[73] Assignee: David Sarnoff Research Center, Inc., Princeton, N.J.

[21] Appl. No.: 624,343

[22] Filed: Dec. 13, 1990

[30] Foreign Application Priority Data

Jan. 23, 1990 [GB] United Kingdom ............... 9001468

[51] Int. Cl.$^5$ .............................................. G06K 9/36
[52] U.S. Cl. ..................................... 358/105; 358/125; 382/54; 364/516
[58] Field of Search ................. 382/6, 54; 358/105, 358/109, 125, 136; 364/516; 342/64, 76

[56] References Cited

U.S. PATENT DOCUMENTS 4,685,146  8/1987  Fenster et al. .................. 382/54
4,847,688  7/1989  Nishimura et al. ............. 358/125
4,864,394  9/1989  Gillard ............................ 358/105
4,870,692  9/1989  Zuiderveld et al. ............ 382/6

OTHER PUBLICATIONS

Burt et al "Object Tracking with a Moving Camera-an Application of Dynamic Motion Analysis" Proceedings of the Workshop on Visual Motion, Irvine, CA Mar. 20-22, 1989, IEEE Computer Society.
Burt et al "A Practical, Real-Time Motion Analysis System for Navigation and Target Tracking", Pattern Recognition for Advanced Missile Systems Conference, Huntsville, AL Nov. 14-15, 1988.

Primary Examiner—Leo H. Boudreau
Assistant Examiner—David Fox
Attorney, Agent, or Firm—W. J. Burke

[57] ABSTRACT

An iterative process, implemented by a feedback loop, responds to all the image data in the respective analysis regions of three consecutive frames of a motion picture, to provide, after a plurality of cycles of operation thereof, an accurate estimation of the motion of either one or both of two differently moving patterns defined by the image data of these respective analysis regions. The analysis region of each frame is preferably large, and may occupy the entire frame area of a frame. The type of differently moving patterns include (1) separation by a motion bounty, (2) overlapping transparent surface in motion, (3) "picket fence" motion (4) masking of a small and/or low-contrast pattern by a dominant pattern, and (5) two-component aperture effects. Also, the operation of this iterative process inherently accurately estimates the motion of image data defining a single moving pattern.

18 Claims, 2 Drawing Sheets

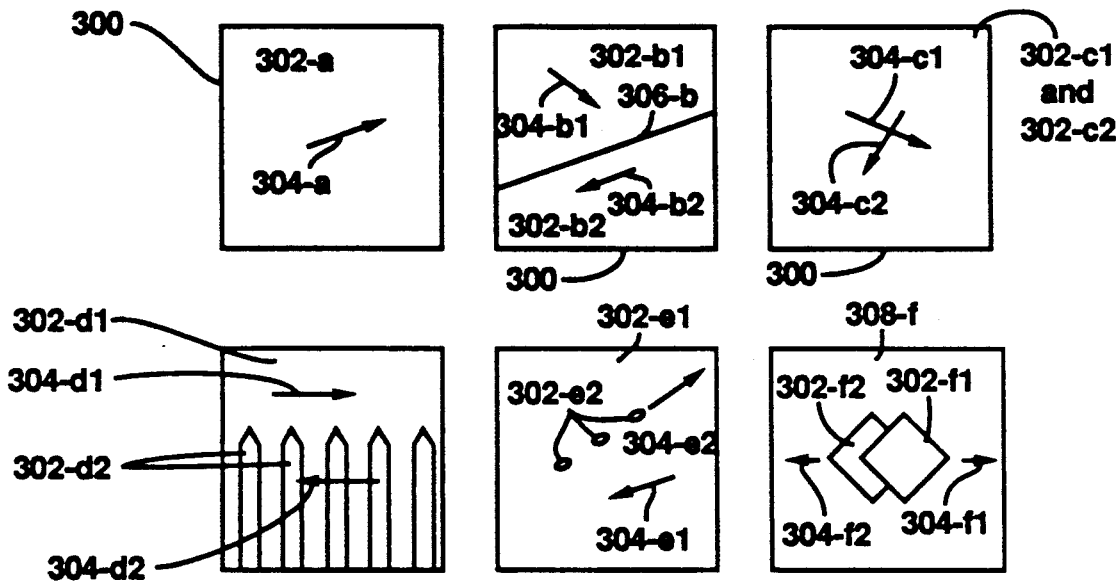
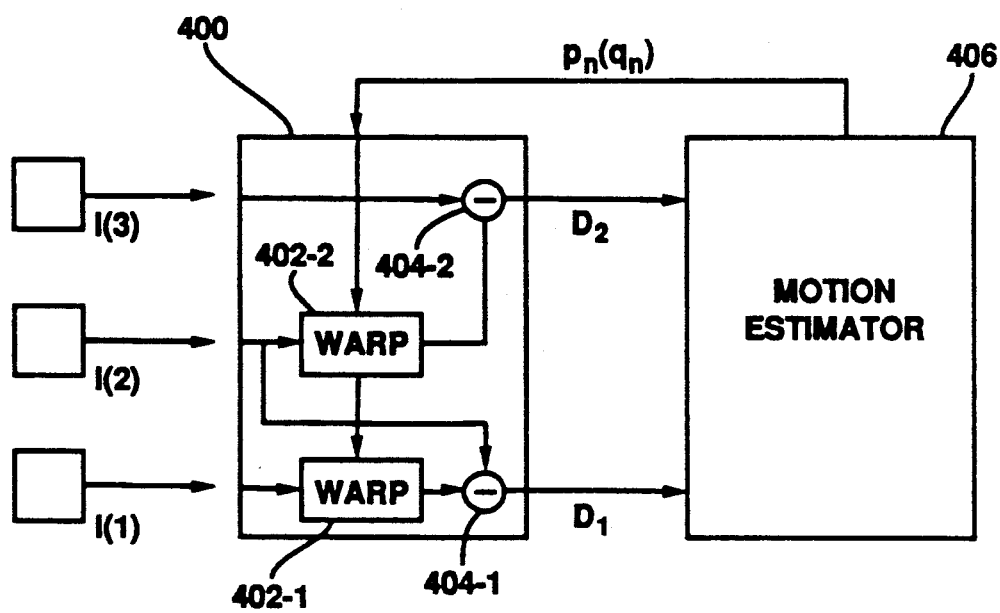

THREE-FRAME TECHNIQUE FOR ANALYZING TWO MOTIONS IN SUCCESSIVE IMAGE FRAMES DYNAMICALLY

BACKGROUND OF THE INVENTION

A well known technique for locating a single moving object (undergoing coherent motion), contained in each of successive frames of a motion picture of an imaged scene, is to subtract the level value of each of the spatially corresponding image data pixels in one of two successive image frames from the other to remove those pixels defining stationary objects in the given scene and leave only those pixels defining the single moving object in the given scene in the difference image data. Further, by knowing the frame rate and the displacement of corresponding pixels of the single moving object in the difference image data, the velocity of the single moving object can be computed. In order to facilitate such processing of the image data in each of the successive frames, it is usual to first convert it to digital form.

However, when the image data of the motion-picture successive fames define two motions, the problem is more difficult. Consider an imaged scene comprising a background region which moves with a certain global velocity pattern in accordance with the movement (e.g., translation, rotation and zoom) of the motion-picture imaging camera recording the scene. In this case, a scene-region occupied by a foreground object that is locally moving with respect to the background region will move in the motion picture with a velocity which is a function of both its own velocity with respect to the background region and the global velocity pattern of the background region itself.

Assuming that a video camera is being used to continuously derive such a motion picture in real time, the problem is to employ, in real time, the image data in the series of successive frames of the motion picture to (1) remove the effects (including those due to parallax) of the global motion and (2) detect and then track the locally-moving foreground object to the exclusion of this global motion.

A conventional general image-motion analysis technique is to compute a separate displacement vector for each image pixel of each frame of a video sequence. This is a computationally challenging task, because it requires pattern matching between frames in which each pixel can move differently from one another.

More recently, a so-called "majority-motion" approach has been developed for solving the aforesaid problem in real time. This "majority-motion" approach and its implementation are disclosed in detail in the article "Object Tracking with a Moving Camera-an Application of Dynamic Motion Analysis," by Burt et al., appearing in *Proceedings of the Workshop on Visual Motion*, Irvine, Calif., Mar. 20-22, 1989, which is published by The Computer Society of the IEEE. Further, certain improvements of this "majority-motion" approach are disclosed in detail in the article "A Practical, Real-Time Motion Analysis System for Navigation and Target Tracking," by Burt et al., *Pattern Recognition for Advanced Missile Systems Conference*, Huntsville, Nov. 14-15, 1988.

All the specific approaches disclosed in these two Burt et al. articles rely on segmenting the image data contained in substantially the entire area of each frame into a large number of separate contiguous small local-analysis window areas. This segmentation is desirable to the extent that it permits the motion in each local-analysis window to be assumed to have only its own computed single translational-motion velocity. The closer the size of each local-analysis window approaches that occupied by a single pixel (i.e., the greater the segmentation), the closer this assumption is to the truth. However, in practice, the size of each local-analysis window is substantially larger than that occupied by a single image pixel, so that the computed single translational-motion velocity of a local-analysis window is actually an average velocity of all the image pixels within that window. This segmentation approach is very artificial in that the periphery of a locally-moving imaged object in each successive frame is unrelated to the respective boundary borders of those local-analysis windows it occupies in that frame. If it happens to occupy the entire area of a particular window, the computed single translational-motion velocity for that window will be correct. However, if it happens to occupy only some unresolved part area of a particular window, the computed single translational-motion velocity for that window will be incorrect. Nevertheless, despite its problems, the "majority-motion" and other approaches employing segmentation disclosed in the aforesaid Burt et al. articles are useful in certain dynamic two-motion image analysis, such as in removing the effects of the global motion so that a locally-moving foreground object can be detected and then tracked to the exclusion of this global motion.

SUMMARY OF THE INVENTION

The present invention, which is responsive to a series of successive frames of a motion picture of an imaged scene, is generally applicable to both single-motion and many types of two-motion analysis. In addition, the present invention permits the use of a relatively large analysis region (which, in some cases, may be an entire frame area), rather than requiring that the frame area be segmented into a plurality of small separate local-analysis windows.

More specifically, the present invention is directed to a method, implemented by a feedback loop, for iteratively motion-processing image-data pixels within respective analysis regions of a first-occurring, second-occurring, and third-occurring frames of a motion-picture during each of successive cycles of operation thereof; wherein the image-data pixels within said analysis regions of these motion-picture frames may define first and second differently-moving patterns.

The feedback loop comprises first and second warp means for respectively shifting the position of the first moving pattern within the respective first-occurring frame and second-occurring frame analysis regions toward the position of the first moving pattern within the respective second-occurring frame and third-occurring frame analysis regions by an amount determined by the value of a warp-control signal applied to the first and second warp means during any odd cycle of iterative operation of the feedback loop. First and second computation means coupled respectively to the first and second warp means perform a predetermined computation on corresponding imagedata pixel values of one of the second-occurring frame and the shifted-pattern first-occurring frame from the other for deriving first computation image data, and perform a predetermined computation on corresponding image-data pixel values of one of the third-occurring frame and the shifted-pattern second-occurring frame from the other for deriving second computation image data. Motion estimation means, responsive to both the first and the second difference image data derived during that odd cycle of iterative operation, computes a first warp-control-signal value for application to the first and second warp means during the immediately following even cycle of iterative operation. This first computed value results in the position of the second of the moving patterns within the respective first-occurring and second-occurring frame analysis regions being shifted toward the position of the second of the moving patterns within the respective second-occurring and third-occurring frame analysis regions by an amount determined by the first computed value.

BRIEF DESCRIPTION OF THE DRAWING

FIGS. 3a-3f illustrate six alternative examples of analysis regions of a frame area, each of which relates to a different type of motion configuration that may be efficiently analyzed by the motion-analysis approach of the present invention; and FIG. 4 is a block diagram of a feedback loop incorporating an illustrative embodiment of the present invention for implementing the motion-analysis approach of the present invention.

DESCRIPTION OF THE PREFERRED EMBODIMENT

In the prior-art approach of FIG. 1, it is assumed that a moving imaging camera (e.g., a video camera) is viewing the ground below from aboard an aircraft in search of an object, such as an automobile, which is locally moving with respect to the ground, for the purpose of detecting the locally-moving object and then tracking its motion with respect to the ground in real time. In this case, the camera derives a motion picture comprising a series of successive image frames of the ground area then being viewed thereby. The successive image frames occur at a relatively high rate (e.g., 30 frames per second) so that ground area being viewed changes only a small amount between any pair of two successive frames. In accordance with this prior-art approach, the frame area 100 of each of the successive image frames is divided into a majority region, which is moving at a global velocity determined by the coherent motion of the aircraft, and a minority region occupied by locally-moving automobile 101 on the ground.

Figure 1:
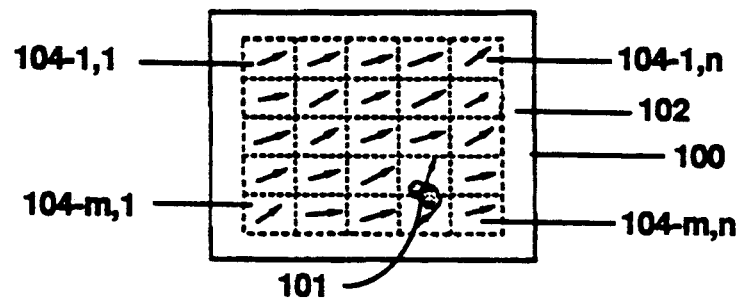
FIG. 1 diagrammatically illustrates the segmentation of a frame area into local-analysis windows employed by the prior-art "majority-motion" approach and improvements thereof for analyzing the local motion on the ground of a moving object, such as an automobile, being viewed by a moving video camera aboard an aircraft.

As shown in FIG. 1, the frame-area 100 of of each of a pair of successive frames, excluding border-area 102 thereof, is divided into an array of sub-area windows 104-11 ... 104-mn, and the local velocity (designated in FIG. 1 by its vector) for each of these sub-area windows is computed. This may be done by displacing the image data in each sub-area window of one of the pair of successive frames with respect to the image data in its corresponding sub-area windows of the other of the pair of successive frames to provide a match therebetween. Borderarea 102 is excluded in order to avoid boundary problems. Further, the image data included in a sub-area window of a frame may overlap to some extent the image data included in an adjacent sub-area window of that frame. In any event, the size of each sub-area window is large compared to the maximum displacement of image data between a pair of successive frames.

The next step is to compute the average velocity of all the local velocities and then determine the size of the difference error between each local velocity and this average velocity. In general, these errors will be small and result from such effects as parallax and the fact that the ground viewed by the moving camera is not flat. However, as shown in FIG. 1, the error for those two sub-area windows which include locally-moving automobile 101 is quite large, because the computed velocities therefor include both the global velocity of the moving camera on the aircraft and the local velocity of moving on the ground. Therefore, the two sub-area windows which include locally-moving automobile 101 are excluded by the fact that their respective errors exceed a given threshold, and the average velocity is then recomputed from only the remaining sub-area windows. This recomputed average velocity constitutes an initial estimate of the global velocity of the motion picture due to the movement of the camera. Because only an initial estimate of the global velocity is being derived, the image data of each of the sub-area windows 104-11 ... 104-mn employed for its computation is preferably of relatively low resolution in order to facilitate the required matching of the image data in each of the large number of corresponding sub-area windows 104-11 ... 104-mn of the pair of successive frames.

Figure 2:
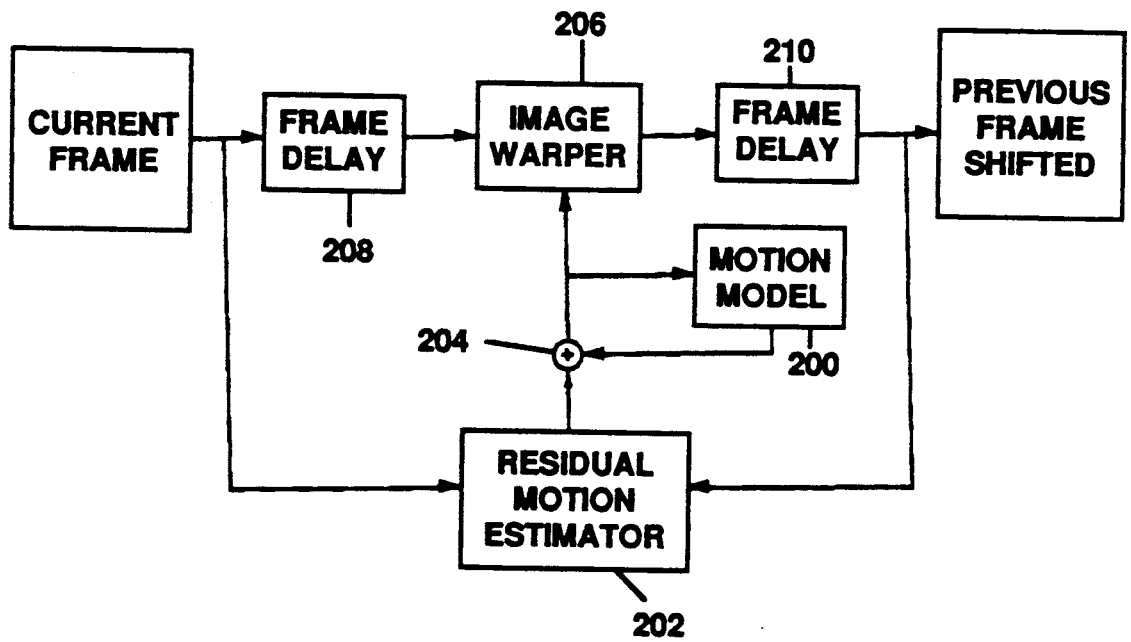
FIG. 2 is a block diagram of a prior-art feedback loop for implementing the prior-art "majority-motion" approach and improvements thereof.

Referring now to FIG. 2, there is shown, in generalized form, a feedback loop for carrying out the aforesaid prior-art approach. The feedback loop comprises motion model 200 (that is derived in whole or at least in part by the operation of the feedback loop), residual motion estimator 202, summer 204, image warper 206, frame delays 208 and 210, and image data from a current frame and from a previous frame that has been shifted by image warper 206. Residual motion estimator 202, in response to image data from the current frame and from the previous shifted frame applied as inputs thereto, derives a current residual estimate, which is added to the previous estimate output from motion model 200 by summer 204 and then applied as a warp control input to image warper 206. Current-frame image data, after being delayed by frame delay 208, is applied as an input to image warper 206. Image warper 206 shifts the frame-delayed current-frame image data in accordance with its warp-control input, and then frame-delays the output therefrom by frame delay 210 to derive the next previous shifted frame.

The feedback loop of FIG. 2 performs an iterative process to refine the initial estimate of the global velocity to the point that substantially all of that portion of the respective computed sub-area windows velocities of the minority region due to global velocity is eliminated. This iterative process derives the respective local residual velocities of the sub-area windows 104-1,1 ... 104-m,n of each consecutively-occuring pair of successive frames, and then uses each of these residual velocities to derive a current estimate of the residual global velocity.

More specifically, the respective local velocities of each pair of successive frames are computed and a current estimate of residual global velocity is made during the each cycle of the iterative process in the manner described above, after the previous estimate of global velocity has, in effect, been subtracted out. In the case of the first cycle, the previous estimate of global velocity is zero, since no previous estimate of global velocity has been made. Therefore, in this case, the residual velocity itself constitutes the initial estimate of the global velocity discussed above.

The effect of this iterative process is that the magnitude of the residual velocities become smaller and smaller for later and later occurring cycles. It is, therefore, preferable that residual motion estimator 202 employ image data of the lowest resolution during the first cycle of the iterative process, and during each successive cycle employ higher resolution image data than was employed during the immediately preceding cycle, in order to minimize the required precision for the matching of the image data in each successive cycle.

Residual motion estimator 202 may comprise hardware and/or software. Several alternative implementation species of residual motion estimator 202 are disclosed in the aforesaid Burt et al. articles. Each of these species provides effective division of the computational burden between general and special purpose computing elements. The first step of ascertaining local motion within the respective sub-area windows is ideally suited for implementation within custom hardware. Data rates are high because the analysis is based on real-time video-rate image data, but processing is simple and uniform because only local translations need be estimated. The second step, in which a global model must be fit to the entire set of of local-motion vectors of all the sub-area windows, is well suited for software implementation in a microprocessor because the computations are relatively complex and global, but the local-motion vector data set is relatively small. Further, as is brought out on the aforesaid Burt et al. articles, the adjustment of the image-data resolution preferably employed in the different cycles of the iteration process, can be efficiently performed by Laplacian and Gaussian pyramid techniques known in the image-processing art.

Further described in the aforesaid Burt et al. articles is an improvement of the "majority-motion" approach which employs a foveation technique. In accordance with this foveation technique, after the each cycle of the above-described iterative process has been completed, only that minority portion of the entire analysis area that has been determined during that cycle not to define the global motion (i.e., automobile 101 is contained within this minority portion) is employed as the entire analysis region during the next cycle of the iterative process. Further, the size of each of the sub-area windows is decreased during each successive cycle, so that the smaller analysis area during each successive cycle can still be divided into the same number of sub-area windows.

The prior-art "majority-motion" approach and its improvements, which employ segmentation, are based on a "single-component" model of local image motion, which assumes that a complex moving scene will be indistinguishable from a single pattern undergoing simple translation when viewed through a sufficiently small window over a sufficiently short interval of time. However, the use of segmentation creates several problems. For example, often the only information on which to base segmentation is the observed image motion itself. Thus, good quality motion analysis depends on image segmentation, while segmentation depends, in turn, on good quality motion information. Further, the accuracy of motion estimation (e.g., one that uses the standard "least squared error" approach to finding the motion that minimizes the squared error) is reduced as the size of the segmented local analysis window becomes smaller (i.e., because, in a smaller window, the maximum number of pixel level values available for motion estimation becomes fewer).

More important, is the fact that the "single-component" model does not fit many types of real world moving images. For example, transparent surfaces moving past one another yield two motion components at a point. Other examples that the "single-component" model does not fit include patterns of light and shadow moving over a differently moving surface, and the boundary between any two differently moving regions within a scene.

The present invention overcomes the problems inherent in this "single-component" model and the need to segment a larger image area into many small local analysis windows. More specifically, the present invention is applicable to all the different types of motion configurations shown, respectively, in FIGS. 3a-3f.

In FIG. 3a, the entire analysis region 300 comprises a single pattern 302-a undergoing coherent motion at the uniform velocity indicated by vector 304-a.

In FIG. 3b, the analysis region 300 comprises two differently moving patterns 302-b1 and 302-b2 separated by a distinct boundary 306-b. Pattern 302-b1 is undergoing coherent motion at the uniform velocity indicated by vector 304-b1 and pattern 302-b2 is undergoing coherent motion at the uniform velocity indicated by vector 304-b2.

In FIG. 3c, the analysis region 300 comprises two differently moving patterns 302-c1 and 302-c2 that appear superimposed. Examples include moving shadows, spotlights, reflection in a pond, etc., as well as the images of actual transparent objects. Pattern 302-c1 is undergoing coherent motion at the uniform velocity indicated by vector 304-c1 and pattern 302-c2 is undergoing coherent motion at the uniform velocity indicated by vector 304-c2.

In FIG. 3d, the analysis region 300 comprises two differently moving patterns 302-d1 and 302-d2 that have a "picket fence" relationship with one another (i.e., analysis region 300 contains images of small or thin foreground objects that move in front of a differently moving background, or the background appears through small gaps in the foreground). Pattern 302-d1 is undergoing coherent motion at the uniform velocity indicated by vector 304-d1 and pattern 302-d2 is undergoing coherent motion at the uniform velocity indicated by vector 304-d2.

In FIG. 3e, the analysis region 300 comprises two differently moving patterns 302-e1 and 302-e2, in which a dominant moving pattern 302-e1 tends to mask a small and/or low-contrast moving pattern 302-e2 (e.g., the image of a football being partially tracked by a moving camera in a sports broadcast). Pattern 302-e1 is undergoing coherent motion at the uniform velocity indicated by vector 304-e1 and pattern 302-e2 is undergoing coherent motion at the uniform velocity indicated by vector 304-e2.

In FIG. 3f, the analysis region 300 has an aperture large enough to include two differently moving partially overlapping patterns 302-f1 and 302-f2, in which one of patterns 302-f1 and 302-f2 is the image of a moving object of interest with respect to the background 308-f of region 300 that happens to be then be in partially overlapping relationship with the pattern image of another differently-moving object with respect to the background 308-f. Pattern 302-f1 is undergoing coherent motion at the uniform velocity indicated by vector 304-f1 and pattern 302-f2 is undergoing coherent motion at the uniform velocity indicated by vector 304-f2.

The present invention employs an iterative process, implemented by the feedback loop shown in FIG. 4, to resolve the motion velocities of any of the one-motion and the two-motion configurations shown in FIGS. 3a-3f. In the performance of the present invention's approach, the analysis region 300 in each of FIGS. 3a-3f may be quite large. For instance, in practice, the image data of an entire frame area comprises as many as 256×256 pixels has been employed as the analysis region, thereby permitting a more accurate estimation of motion velocity to be made than could have been made by using the small segmented local analysis window of the prior art.

Referring now to FIG. 4, there is shown the respective image-data analysis regions I(1), I(2) and I(3) comprising a group of first-occurring, second-occurring, and third-occurring ones of three frames of an ongoing series of successive frames. While these three frames need not be consecutive frames (e.g., when the involved velocities are very small compared to the frame rate, it may be desirable, in practice, that the three frames of the group be made up every other one or even one out of every three of the ongoing series of successive frames), it is assumed solely for illustrative purposes that the the group comprises three consecutive frames. Based on this assumption, frame I(3) corresponds to the current one of the ongoing series of successive frames; frame I(2) corresponds to the frame which immediately preceded frame I(3), and frame I(1) corresponds to the frame which immediately preceded frame I(2). Thus, it should be seen that during the frame period immediately following any current frame period, frame I(2) would replace frame I(1), frame I(3) would replace frame I(2), and the next (i.e., fourth-occurring) one of the ongoing series of successive frames would replace frame I(3). For illustrative purposes, it is assumed that each of these analysis regions includes substantially all of the image data, in digital form, within its entire frame area. However, it should be understood that, in practice, the image-data analysis region of a frame may, if desired, be limited to a selected relatively-large subregion of its entire frame area. Further, although not specifically shown in FIG. 4, it should be understood that frames delays, similar to those shown in FIG. 2, are provided for making an image-data analysis region that is originally the third-occurring analysis region I(3), the second-occurring analysis region I(2) one frame period later, and the first-occurring analysis region I(1) two frame periods later.

As shown in FIG. 4, block 400 includes first warp means 402-1, second warp means 402-2, first subtraction means 404-1 and second subtraction means 404-2. The image-data pixels of first-occurring analysis region I(1) are applied as an input to first warp means 402-1; the image-data pixel output from first warp means 402-1 is applied as a first input to first subtraction means 404-1; the image-data pixels of second-occurring analysis region I(2) are applied both as an input to second warp means 402-2 and as a second input to first subtraction means 404-1; the image-data pixel output from second warp means 402-2 is applied as a second input to second subtraction means 404-2; and the image-data pixels of third-occurring analysis region I(3) are applied as a second input to second subtraction means 404-2. The difference $D_1$ in image-data pixel level values, between the level value of each image-data pixel applied as a second input to first subtraction means 404-1 and the level value of its corresponding image-data pixel applied as a first input thereto, appearing at the output of first subtraction means 404-1, is applied as a first input to motion estimator 406. The difference $D_2$ in image-data pixel level values, between the level value of each image-data pixel applied as a second input to second subtraction means 404-2 and the level value of its corresponding image-data pixel applied as a first input thereto, appearing at the output of second subtraction means 404-2, is applied as a second input to motion estimator 406. Motion estimator 406, in response to the image-data pixel difference level values $D_1$ and $D_2$ applied as first and second inputs thereto, alternatively derives a warp-control signal $p_n$ or $q_n$ (where n indicates the ordinal number of the iterative cycle of operation of the FIG. 4 feedback loop that derived that warp-control signal). This derived warp-control signal, which, in effect, predicts the amount of expected change in image-data pixel level values taking place during a frame period due to estimated image motion, causes each of warp means 402-1 and 402-2 to shift its input image by an amount which compensates for such estimated image motion.

Motion estimator 406 of FIG. 4 performs functions that are generally similar to those performed in the prior art by motion model 200, residual motion estimator 202 and summer 204 of FIG. 2 in combination with one another. More specifically, in FIG. 4, (1) an estimate of residual motion is made from the current image-data pixel difference level values of $D_1$ and $D_2$ during each iterative cycle of the feedback loop; and (2) this estimate of residual motion is then added to the stored estimate of motion accumulated during all the previous iterative cycles of the feedback loop to derive the current estimate of motion for use as the warp-control signal $p_n$ or $q_n$ during the current iterative cycle and for storing this current estimate of motion for use during the next iterative cycle of the feedback loop. However, motion estimator 406 of FIG. 4 differs from the motion estimator of FIG. 2 in that it is programmed to implement the three-frame, two-motion, large analysis region approach of the present invention, rather than being programmed to implement the two-frame, one-motion, small local analysis window approach of the prior art, described above. Specifically, motion estimator 406 separately stores the current estimate of each of the two image motions for use during the next iterative cycle of the feedback loop of FIG. 4.

It can be shown that the motion p of a selected one of two image patterns in an analysis region can be recovered, if the motion q of the other of these two image patterns in the analysis region is known. More specifically, the motion p can be recovered exactly only if the respective motions p and q are additively combined. This is the case with reflections in surfaces, but not with shadows (which are multiplicatively combined with the image objects on which fall) or with opaque foreground objects (which occult the background image structure). In these latter cases, the cancellation of motion q by subtraction will not be complete. The recovery of accurate estimate of motion p in the presence of a partially removed motion q can be achieved, but it depends on specific properties of the motion estimator.

Unfortunately, in practice, neither motion p nor motion q is known. However, in accordance with the principles of the present invention, the values of either one or both the two motions p and q (such as the velocity of each of the respective patterns shown in analysis window 300 of any of FIGS. 3a–3f) can be estimated to any desired degree of accuracy by the following iterative procedure, which is implemented by the FIG. 4 illustrative embodiment of the feedback loop:

1. Set an initial estimate of the motion $p_0$ of a selected one of the two patterns applied as the warp-control signal to first and second warp means 402-1 and 402-2.
2. Form the difference images $D_1$ and $D_2$ at the outputs of first and second subtraction means 404-1 and 404-2, using the latest estimate of motion $p_n$.
3. Use $D_1$ and $D_2$ in motion estimator 406 to obtain an estimate of the motion $q_{n+1}$ of the other of the two patterns, and apply $q_{n+1}$ as the warp-control signal to first and second warp means 402-1 and 402-2.
4. Form the difference images $D_1$ and $D_2$ at the outputs of first and second subtraction means 404-1 and 404-2, using the latest estimate of motion $q_{n+1}$.
5. Use $D_1$ and $D_2$ in motion estimator 406 to obtain an update estimate of the motion $p_{n+2}$ of the other of the two patterns, and apply $p_{n+2}$ as the warp-control signal to first and second warp means 402-1 and 402-2.
6. Repeat starting at step 2.

It has been found that this above-described three-frame, six-step iterative process of the present invention, implemented by the feedback loop of FIG. 4, is highly convergent. More specifically, regardless of how far removed the value of the initial (guess) estimate of the motion $p_0$ of the selected one of the two patterns is from the actual value of motion p, the actual value of motion p is recovered, to an accuracy of roughly 1%, within five iteration cycles of this three-frame, six-step process (with the recovered actual value of motion p, achieved after the completion of step 5 of a final iterative cycle, being separately stored in motion estimator 406). Obviously, the closer the value of the initial (guess) estimate of the motion $p_0$ is to the actual value of motion p, the fewer iteration cycles are required to recover the actual value of motion p to a predetermined accuracy. Similarly, the actual value of motion q, which is recovered to any desired predetermined accuracy after the completion of step 3 of a final iterative cycle, is separately stored in motion estimator 406.

By applying the separately-stored recovered actual value of motion p as the warp control signal to first and second warp means 402-1 and 402-1, the output image from either of these warp means clearly reveals only the selected one of the two patterns in the analysis region of the ongoing series of motion-picture frames with substantially zero motion, (while the other of the two analysis-region patterns, which is undergoing motion q, is broken up into substantially unresolvable background noise in the ongoing series of motion-picture frames). Similarly, by applying the separately-stored recovered actual value of motion q as the warp control signal to first and second warp means 402-1 and 402-1, the output image from either of these warp means clearly reveals only the other of the two patterns in the analysis region of the ongoing series of motion-picture frames with substantially zero motion, (while the selected one of the two analysis-region patterns, which is undergoing motion p, is broken up into substantially unresolvable background noise in the ongoing series of motion-picture frames).

The fact that the image-data analysis regions operated on by the feedback loop of FIG. 4 are preferably quite large, means that motion-estimation analysis can be made with larger pixel neighborhoods. This improves signal/noise aspects of the motion-estimation computation in motion estimator 406, and leads to more precise and robust motion estimates. This results in rapid convergence, so that both p and q can be recovered to an accuracy of 0.01 pixels per frame after only a few iterations.

In the FIG. 4 illustrative embodiment, the iterative isolation of a single motion component by estimation of the motion of another motion component and cancellation of that component is accomplished only through subtraction by first and second subtraction means 404-1 and 404-2. However, this need not be the case. For instance, if the components are known (or can be inferred) to be combined in some other way (for example multiplicatively) then the cancellation can be done by attempting to invert this combination rule (for example by division). Further, many such cases can be handled using an architecture in which a nonlinear transformation ("lookup table") is introduced at the inputs and output of first and second subtraction means 404-1 and 404-2. The characteristics of this transformation can either be set in advance or modified adaptively in order to improve cancellation. For example, if the input transformation is set to be logarithmic and the output transformation is made exponential, then multiplicatively combined components will be handled correctly. Thus, in general, first and second subtraction means 404-1 and 404-2 of the FIG. 4 illustrative embodiment may be replaced by first and second computation means, each of which performs an appropriate predetermined computation on the inputs thereto.

While the present invention is particularly designed to solve the two-motion problem, such as exemplified by each of the different two-motion configurations of respective FIGS. 3b–3f, it inherently also solves the one-motion problem, such as exemplified by the one-motion configuration of FIG. 3a. In this latter case, the value of the respective amplitudes of the non-existent other pattern zero. Therefore, it does not matter whether the one-motion of the single existent pattern is assumed to be either p or, alternatively, q.

In the above-described preferred embodiment, it was assumed that three consecutive-frame image-data analysis regions I(1), I(2) and I(3) are part of an ongoing series of frames, so that the image data in each one of these regions I(1), I(2) and I(3) changes slightly each frame period. Although this is the usual case, it is not essential. Alternatively, the image data in a group of the same unchanging three regions I(1), I(2) and I(3) could be used over and over again during all of the iterative cycles of operation of the feedback loop of FIG. 4.

What is claimed is:

1. A feedback loop for iteratively motion-processing image-data pixels within respective analysis regions of a first-occurring frame, a second-occurring frame, and a third-occurring frame of a motion-picture during each of successive cycles of operation thereof; wherein the image-data pixels within said analysis regions of these motion-picture frames may define first and second differently-moving patterns; said feedback loop comprising:

first warp means for shifting the position of said first of said moving patterns within said first-occurring frame analysis region toward the position of said first of said moving patterns within said second-occurring frame analysis region by an amount determined by the value of a warp-control signal applied to said first warp means during any odd cycle of iterative operation of said feedback loop;

second warp means for shifting the position of said first of said moving patterns within said second-occurring frame analysis region toward the position of said first of said moving patterns within said third-occurring frame analysis region by an amount determined by the value of said warp-control signal applied to said second warp means during that odd cycle of iterative operation of said feedback loop;

first computation means coupled to said first warp means for performing a predetermined computation on corresponding image-data pixel values of said second-occurring frame and said shifted-pattern first-occurring frame for deriving first computation image data;

second computation means coupled to said second warp means for performing said predetermined computation on corresponding image-data pixel values of said third-occurring frame and said shifted-pattern second-occurring frame for deriving second computation image data; and motion estimation means, responsive to both said first and said second computation image data derived during that odd cycle of iterative operation, for computing a first warp-control-signal value for application to said first and second warp means during the immediately following even cycle of iterative operation, which first computed value results in the position of said second of said moving patterns within said respective first-occurring and second-occurring frame analysis regions being shifted toward the position of said second of said moving patterns within said respective second-occurring and third-occurring frame analysis regions by an amount determined by said first computed value.

2. The feedback loop defined in claim 1, wherein:
said motion estimation means is responsive to both said first and said second computation image data derived during any even cycle of iterative operation for computing a second warp-control-signal value for application to said first and second warp means during the immediately following odd cycle of iterative operation, which second computed value results in the position of said first of said moving patterns within said respective first-occurring and second-occurring frame analysis regions being shifted closer to the position of said first of said moving patterns within said respective second-occurring and third-occurring frame analysis regions than said first of said moving patterns was shifted during the immediately preceding odd cycle of iterative operation.

3. The feedback loop defined in claim 2, wherein:
said warp-control-signal applied to said first and second warp means during the first cycle of iterative operation has any arbitrary value that results in the position of said first of said moving patterns within said respective first-occurring and toward the position of said first of said moving patterns within said respective second-occurring and third-occurring frame analysis regions.

4. The feedback loop defined in claim 2, wherein:
said motion estimation means is responsive to both said first and said second computation image data derived during each odd cycle of iterative operation above said first cycle for computing a particular first warp-control-signal value for application to said first and second warp means during the immediately following even cycle of iterative operation, which particular first computed value results in the position of said second of said moving patterns within said respective first-occurring and second-occurring frame analysis regions being shifted closer to the position of said second of said moving patterns within said respective second-occurring and third-occurring frame analysis regions than said second of said moving patterns was shifted during the immediately preceding even cycle of iterative operation.

5. The feedback loop defined in claim 4, wherein:
said warp-control-signal applied to said first and second warp means during the first cycle of iterative operation has any arbitrary value that results in the position of said first of said moving patterns within said respective first-occurring and toward the position of said first of said moving patterns within said respective second-occurring and third-occurring frame analysis regions.

6. The feedback loop defined in claim 5, wherein said first-occurring, second-occurring, and third-occurring frames comprise a group of the current three consecutive frames of the ongoing successive frames of said motion picture occurring in real time, whereby the three frames comprising said group are updated by one frame every frame period of said motion picture.

7. The feedback loop defined in claim 5, wherein each of the respective analysis regions of said first-occurring, said second-occurring frame, and said third-occurring frames occupies substantially the entire frame area of a frame.

8. The feedback loop defined in claim 1, wherein said first-occurring, second-occurring, and third-occurring frames comprise a group of the current three consecutive frames of the ongoing successive frames of said motion picture occurring in real time, whereby the three frames comprising said group are updated by one frame every frame period of said motion picture.

9. The feedback loop defined in claim 1, wherein each of the respective analysis regions of said first-occurring, said second-occurring frame, and said third-occurring frames occupies substantially the entire frame area of a frame.

10. The feedback loop defined in claim 1, wherein:
said first computation means comprises first subtraction means; and
said second computation means comprises second subtraction means.

11. The feedback loop defined in claim 1, wherein:
said first computation means consists of first subtraction means, whereby said first computation image data constitutes first difference image data; and
said second computation means consists of second subtraction means, whereby said second computation image data constitutes second difference image data.

12. A method for iteratively motion-processing image-data pixels within respective analysis regions of a first-occurring frame, a second-occurring frame, and a third-occurring frame of a motion-picture during each of successive cycles of operation thereof; wherein the image-data pixels within said analysis regions of these motion-picture frames may define a first moving pattern having a motion p and a second moving pattern having a motion q different from p; said method comprising the steps of:

a) setting the initial estimate of motion p of said first moving pattern at $p_O$;

b) shifting the position of said first moving pattern within each of said respective first-occurring and second-occurring frame analysis regions toward the position of said first moving pattern within each of said respective second-occurring and third-occurring frame analysis regions by an amount in accordance with the latest estimate $p_n$ of the motion p of said first moving pattern (where n indicates the ordinal number of that iterative cycle of operation that derived that estimate), and said estimate $p_n$ of motion p has a first certain accuracy;

c) performing a predetermined computation on corresponding image-data pixel values of said second-occurring frame and said step (b) shifted-pattern first-occurring frame for deriving step (c) first computation image data $D_1$, and performing said predetermined computation on corresponding image-data pixel values of said third-occurring frame and said step (b) shifted-pattern second-occurring frame for deriving step (c) second computation image data $D_2$;

d) using step (c) computation image data $D_1$ and $D_2$ to derive an estimate $q_{n+1}$ of the motion q of said second moving pattern with a second certain accuracy which is higher than the accuracy of the estimate of motion q made by any preceding cycle of iterative operation;

e) shifting the position of said second moving pattern within each of said respective first-occurring and second-occurring frame analysis regions toward the position of said second moving pattern within each of said respective second-occurring and third-occurring frame analysis regions by an amount in accordance with the estimate $q_{n+1}$ of the motion q of said second moving pattern;

f) performing said predetermined computation on corresponding image-data pixel values of said second-occurring frame and said step (e) shifted-pattern first-occurring frame for deriving step (f) first computation image data $D_1$, and performing said predetermined computation on corresponding image-data pixel values of said third-occurring frame and said step (e) shifted-pattern second-occurring frame for deriving step (f) second computation image data $D_2$; and g) using step (f) difference image data $D_1$ and $D_2$ to derive an estimate $p_{n+2}$ of the motion p of said first moving pattern with an accuracy which is higher than the first certain accuracy of the estimate $p_n$ of motion p.

13. The method defined in claim 12, comprising the additional step of:

h) repeating, in order, at least some of steps (b) to (h).

14. The method defined in claim 12, wherein the initial estimate $p_0$ of motion p of said first moving pattern, set in step (a), has an arbitrary value.

15. The method defined in claim 12, wherein said first-occurring, second-occurring, and third-occurring frames comprise a group of the current three consecutive frames of the ongoing successive frames of said motion picture occurring in real time, whereby the three frames comprising said group are updated by one frame every frame period of said motion picture.

16. The method defined in claim 12, wherein each of the respective analysis regions of said first-occurring, said second-occurring frame, and said third-occurring frames occupies substantially the entire frame area of a frame.

17. The method defined in claim 12, wherein:

step c) consists of the step of subtracting corresponding image-data pixel values of said second-occurring frame and said step (b) shifted-pattern first-occurring frame for deriving step (c) first difference image data $D_1$, and subtracting corresponding image-data pixel values of said third-occurring frame and said step (b) shifted-pattern second-occurring frame for deriving step (c) second difference image data $D_2$; and step f) consists of the step of subtracting corresponding image-data pixel values of said second-occurring frame and said step (e) shifted-pattern first-occurring frame for deriving step (f) first difference image data $D_1$, and subtracting corresponding image-data pixel values of said third-occurring frame and said step (e) shifted-pattern second-occurring frame for deriving step (f) second computation image data $D_2$.

18. The method defined in claim 17, comprising the additional step of:

h) repeating, in order, at least some of steps (b) to (h).

* * * * *